United States Patent
King

(10) Patent No.: US 9,510,680 B2
(45) Date of Patent: Dec. 6, 2016

(54) SHELF FOR A DESKTOP COMPUTER

(71) Applicant: Steven G. King, Alameda, CA (US)

(72) Inventor: Steven G. King, Alameda, CA (US)

( * ) Notice: Subject to any disclaimer, the term of this patent is extended or adjusted under 35 U.S.C. 154(b) by 228 days.

(21) Appl. No.: 14/450,138

(22) Filed: Aug. 1, 2014

(65) Prior Publication Data

US 2016/0029797 A1 Feb. 4, 2016

(51) Int. Cl.
*A47B 96/02* (2006.01)
*A47B 97/00* (2006.01)
*G06F 1/18* (2006.01)
*G06F 1/16* (2006.01)

(52) U.S. Cl.
CPC ............... *A47B 97/00* (2013.01); *G06F 1/16* (2013.01); *G06F 1/1601* (2013.01); *G06F 1/181* (2013.01); *A47B 2097/005* (2013.01); *G06F 2200/1612* (2013.01); *G06F 2200/1631* (2013.01)

(58) Field of Classification Search
CPC ............ F16M 2200/027; G06F 1/1607; A47B 2097/005
See application file for complete search history.

(56) References Cited

U.S. PATENT DOCUMENTS

| | | | |
|---|---|---|---|
| 5,738,320 A * | 4/1998 | Matos | A47B 81/061 108/1 |
| 6,240,857 B1 | 6/2001 | Elizer | |
| 6,394,404 B1 * | 5/2002 | Cyrell | A47B 57/56 248/241 |
| 7,551,432 B1 | 6/2009 | Bockheim et al. | |
| 7,621,544 B2 | 11/2009 | Rossini | |
| D605,193 S | 12/2009 | Andre et al. | |
| 7,950,335 B1 | 5/2011 | Almond et al. | |
| 8,009,414 B2 | 8/2011 | Ishida et al. | |
| 8,174,823 B2 | 5/2012 | Green | |
| 8,523,132 B2 | 9/2013 | Chen et al. | |
| 8,576,554 B2 | 11/2013 | Quijano | |
| 9,121,423 B2 * | 9/2015 | Sharpe | F16M 11/041 |
| 2008/0068784 A1 | 3/2008 | Bouissiere | |
| 2009/0008349 A1 | 1/2009 | Kim | |
| 2009/0057501 A1 * | 3/2009 | Huang | F16M 11/24 248/157 |

(Continued)

FOREIGN PATENT DOCUMENTS

CN 101312074 5/2007

OTHER PUBLICATIONS

Twelve South, "Little shelf that is out of sight, but not out of reach", Internet. Available at http://www.twelvesouth.com/product/back-pack-for-imac. Last accessed Apr. 2014.

*Primary Examiner* — Bradley Duckworth
(74) *Attorney, Agent, or Firm* — PatentBest; Andrew McAleavey

(57) ABSTRACT

A shelf for a desktop computer is disclosed, as are shelf and desktop computer combinations. The desktop computer is generally of the type having a computing unit and a support arm that extends downward at an angle and tapers. The shelf has an open slot along a rear edge. The slot allows the shelf to be placed on the support arm, where it remains, cantilevered, extending generally horizontally from the support arm at a defined vertical position. The shelf is without external mounting hardware, support flanges, or other such elements, although in some embodiments, small, internal set screws may be included.

18 Claims, 11 Drawing Sheets

(56) References Cited

U.S. PATENT DOCUMENTS

2013/0058030 A1   3/2013  Mabon
2015/0184791 A1*  7/2015  Chow ................ F16M 11/2021
                                                            248/124.2

* cited by examiner

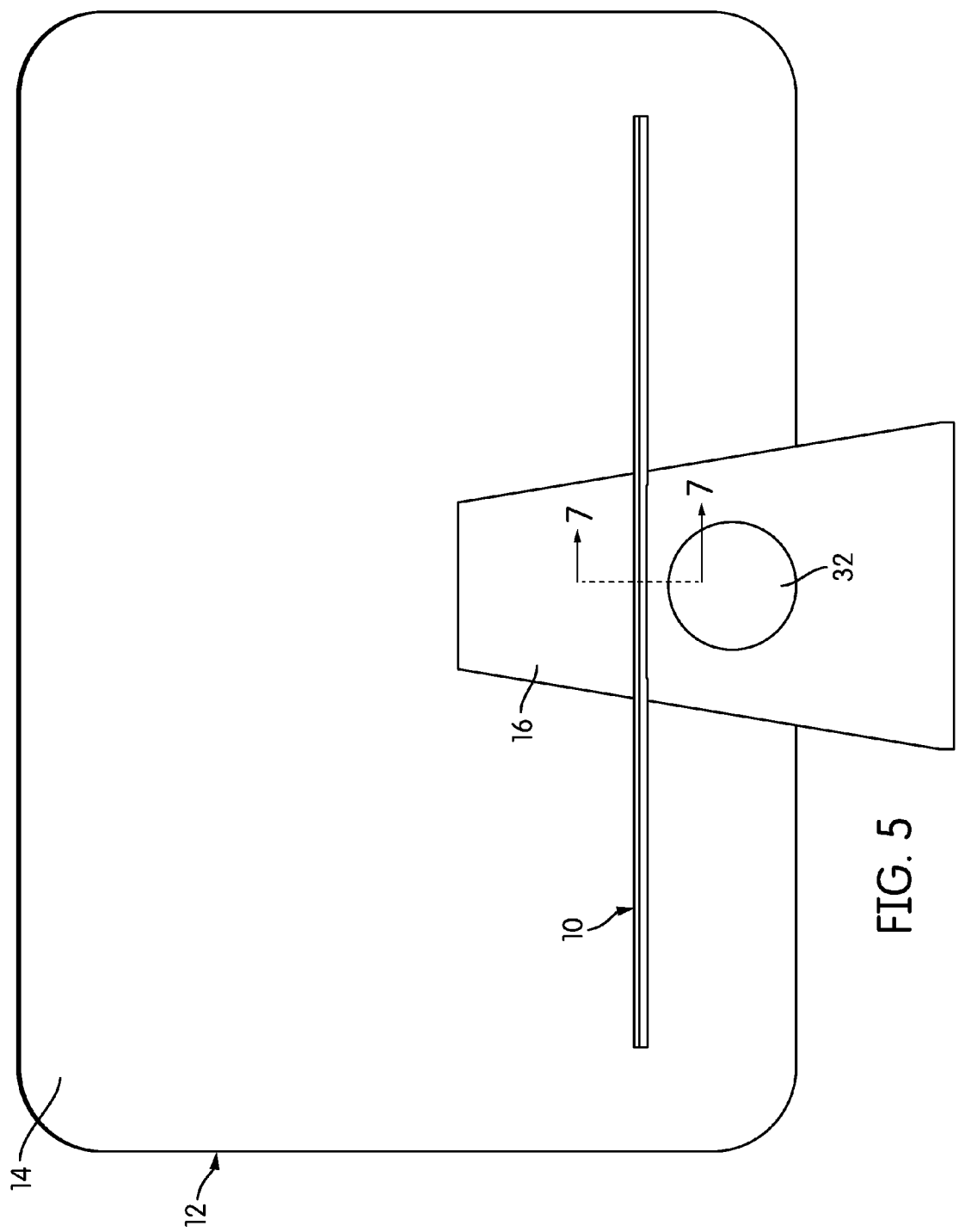

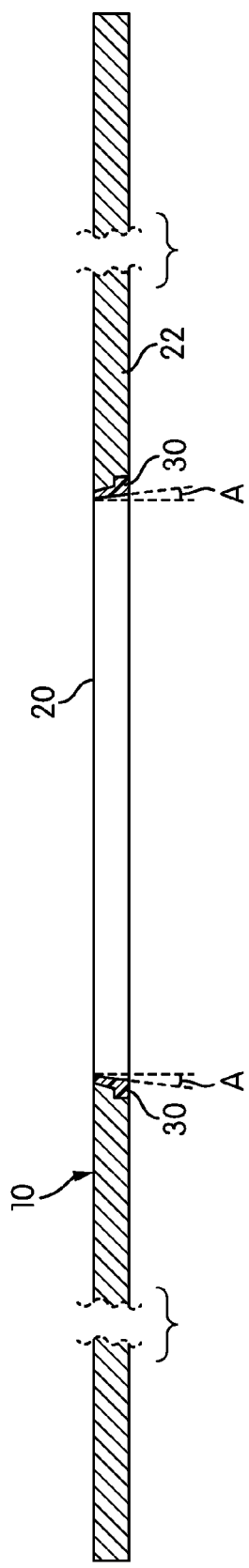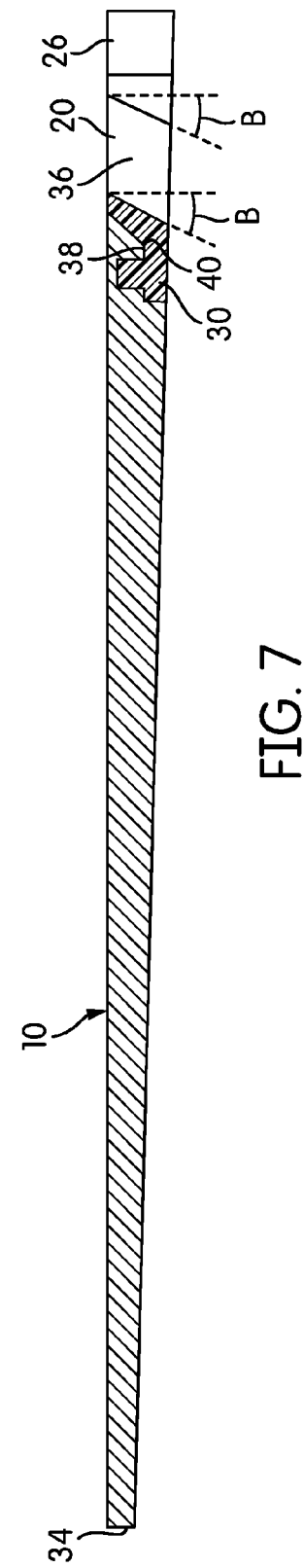

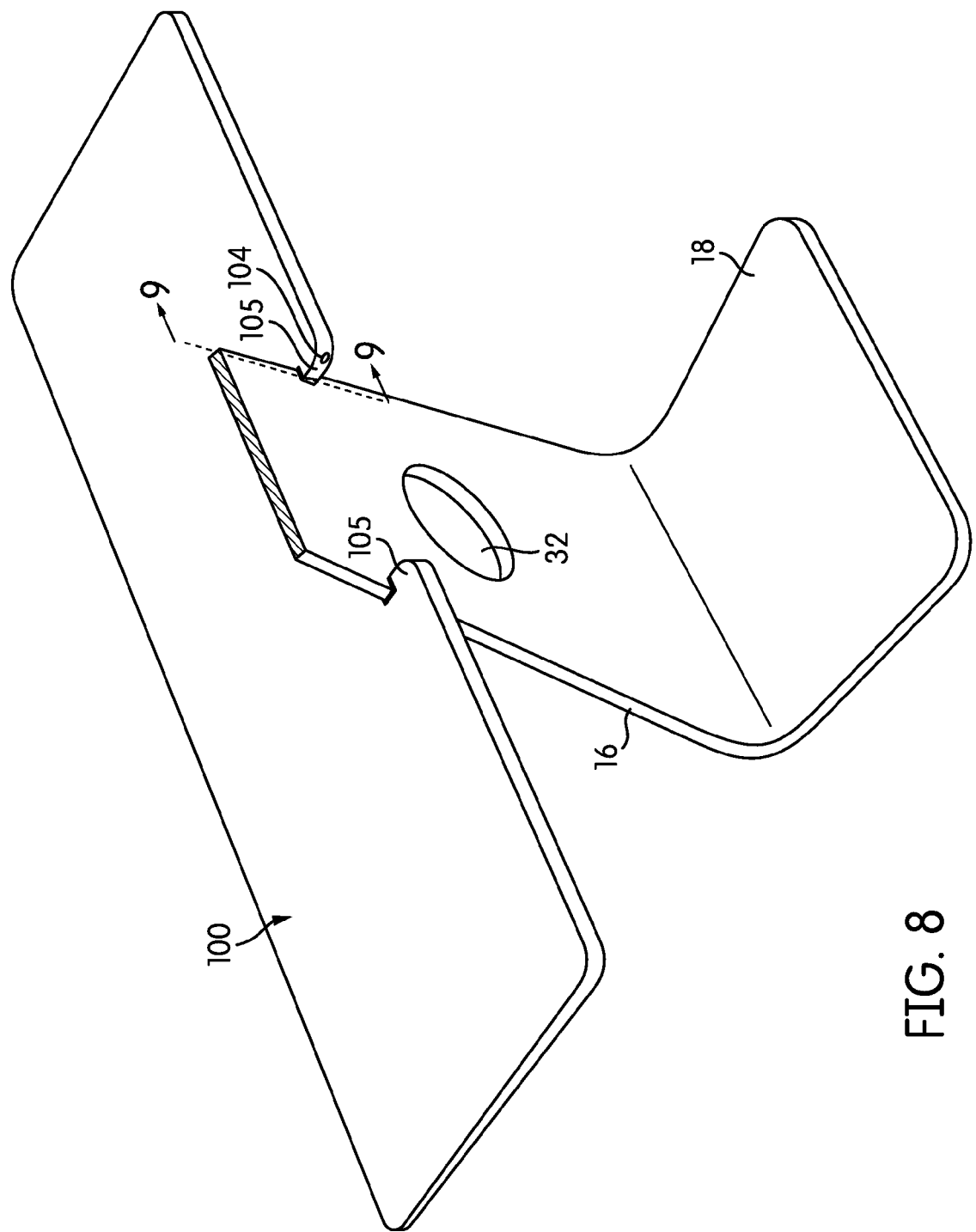

SHELF FOR A DESKTOP COMPUTER

BACKGROUND OF THE INVENTION

1. Field of the Invention

In general, the invention relates to shelving that is attachable to a support, and more particularly, to a shelf for a desktop computer.

2. Description of Related Art

The last decade has seen a resurgence of industrial design in the consumer electronics industry. Nowhere has that resurgence been more evident than in the design of desktop and laptop computers. The changes are particularly notable in desktop computers—whereas desktop computers were once boxy enclosures that were designed to "hide" in or under desks, they are now made in a variety of shapes that are meant for display.

The renewed interest in industrial design has coincided with many improvements in the underlying technology itself that allow components to be packaged in new and different ways. For example, improvements in LCD display technology and shrinking component sizes have allowed a number of desktop computers to be constructed in a "flat panel" configuration, in which the logic board, memory, drives for storage, and other computing components are placed in the same housing as the LCD display.

The best known of these flat-panel desktop computer systems are probably those of Apple, Inc., which has been a leader in the design-in-computing movement. In particular, Apple's iMAC® line of desktop computers features a flat-panel, integrated LCD display and computer that is supported by a single-piece arm that connects to the flat panel in its rear center and extends downwardly at an angle, curving into a foot that supports the computer on a desk or other flat surface. The support arm in an iMAC® desktop computer is trapezoidal in shape and broadens in width as it extends downwardly from the computer. This basic design is shown, for example, in U.S. Design Pat. No. D605,193 to Andre et al., the contents of which are incorporated by reference in their entirety. While the look of the flat-panel computer itself has changed considerably over the years, the design of the support arm has seen only relatively minor changes.

Almost every area of the consumer electronics industry has a significant associated peripherals industry, and computers are no exception. Generally speaking, a peripheral is any device that increases or improves upon the capabilities or performance of a piece of equipment, or is otherwise designed to work with that piece of equipment. Classic computer peripherals include devices like printers and optical scanners. Typically, some peripherals are made by or under license from a computer manufacturer, like Apple, Inc., while other peripherals are made and sold by third party vendors with no connection to the manufacturer of the computer itself. Peripherals that are branded and sold by a manufacturer like Apple Inc. typically maintain a common functional and design aesthetic that closely matches that of the computer or other device with which they are designed to function. Third-party peripherals may or may not closely match the aesthetic of the computer or other device with which they are designed to function.

In the last few years, one peripheral manufacturer has determined that it is possible to use the support arm of a desktop computer like the iMAC® to support a shelf. U.S. Pat. No. 8,174,823 to Green describes this shelf and the manner of attaching it to the computer. According to the Green patent, the shelf is attached to the computer's support arm using connectors, like C-clamps, which are positioned and secured to the arm. From a mechanical design standpoint, using a clamp to connect a shelf to a support is an easy choice. However, clamps require effort to manipulate and secure, and may make it more difficult to set up the shelf.

In fact, the broader patent literature has many examples of attachable shelves that either use a mechanical connector to attach the shelf to its base of support, like the Green patent, or use additional features to counterbalance or support the load. For example, U.S. Pat. No. 7,950,335 to Almond, which discloses a shelf adapted to be attached to a tripod, uses an upturned flange that extends behind the support to counterbalance the bending moments created by the cantilevered load on the shelf.

Thus, while there are a number of ways in which a shelf might be attached to a computer like the iMAC® desktop computer, many of those ways are cumbersome for the user. In particular, the presence of additional connectors, flanges, and other mechanical pieces and parts adds unwanted mechanical complexity and may also detract significantly from the appearance of the shelf and of the computer-shelf combination as a whole. In a product with as strong a minimalist design aesthetic as the iMAC® desktop computer, the presence of additional connectors and mechanical parts in a peripheral shelf, and the difficulty of using them, may discourage users from purchasing and using the shelf.

SUMMARY OF THE INVENTION

One aspect of the invention relates to a shelf. The shelf has an upper surface, a lower surface, a front edge, and a rear edge. An opening is defined in the rear edge. The opening is contiguous with a slot defined through the thickness of the slot. The slot has a width that is wider than the opening, such that a pair of opposed projections are defined between the opening and the slot. Opposite interior sidewalls of the slot are angled inwardly at a first angle, such that the slot is wider at the lower surface than at the upper surface. Additionally, a pair of opposing channels are defined in the opposite interior sidewalls of the slot. The pair of opposing channels are inclined at a second angle.

The features of the shelf and its slot allow the shelf to rest generally horizontally at a defined vertical position on a support that tapers at an angle that is approximately equal to the first angle and makes an angle with the vertical approximately equal to the second angle. The support may be the support arm of a desktop computer. Notably, the shelf is without external mounting hardware, out-of-plane support flanges, connectors, or other such structures, although in some embodiments small internal set screws may be used at the interface between the shelf and support. Additionally, in some embodiments, an insert may be provided, made of plastic or another suitable material, that inserts into the slot and at least partially defines its features. The insert protects the support from marring or scraping.

Another aspect of the invention relates to the combination of a desktop computer and a shelf. The desktop computer may be of the flat panel type with a computing unit supported by a support arm that descends from the computing unit. The shelf has the features described above, and can be installed on the support arm of the computing unit without external clamps, connectors, or other types of mounting hardware.

Yet another aspect of the invention relates to the physical structures and methods of attaching a shelf, like the one described above, to a support without external clamps, mechanical connectors, or other mounting hardware, the presence of which might discourage a user from installing and using the shelf.

Other aspects, features, and advantages of the invention will be set forth in the description that follows.

BRIEF DESCRIPTION OF THE DRAWING FIGURES

The invention will be described with respect to the following drawing figures, in which like numerals represent like features throughout the description, and in which:

FIG. 5 is a rear elevational view of the shelf installed on the support arm;

FIG. 6 is a sectional view of the shelf, taken through Line 5-5 of FIG. 3;

FIG. 7 is a sectional view of the shelf, taken through Line 6-6 of FIG. 4;

FIG. 8 is a perspective view of another embodiment of a shelf, shown as installed on the support arm of a desktop computer;

DETAILED DESCRIPTION

Figure 1:
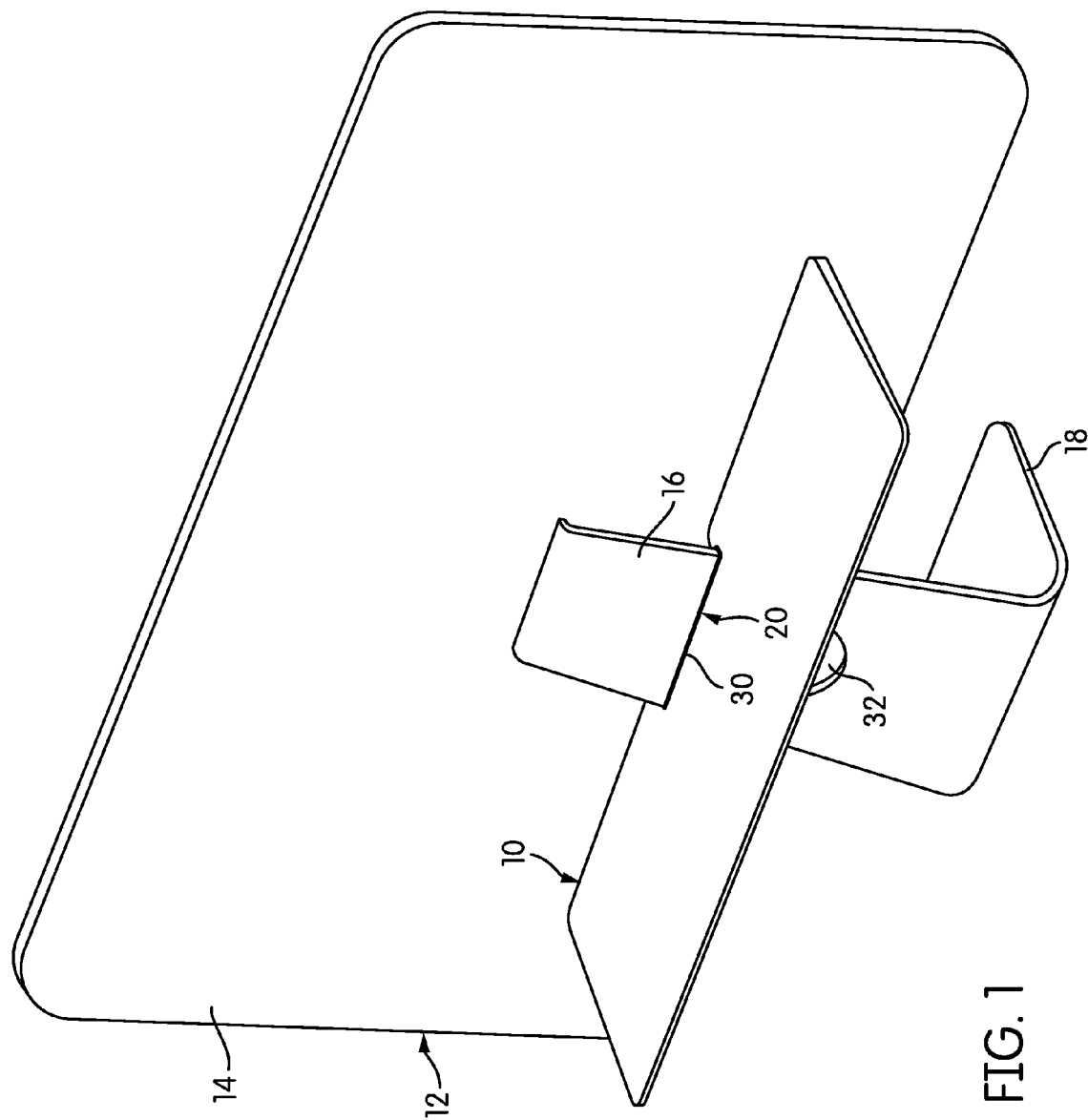
FIG. 1 is a perspective view of a shelf, shown as installed on the support arm of a desktop computer, according to an embodiment of the present invention.

FIG. 1 is a perspective view of a shelf, generally indicated at 10, according to one embodiment of the invention. In the view of FIG. 1, the shelf 10 is shown as being installed on a desktop computer 12. The desktop computer 12 is of the flat panel variety, and has a flat panel display and computing unit 14 which is supported by a support arm 16. The support arm 16 is attached to the display and computing unit 14 at approximately its center and extends down for a distance before turning horizontal and becoming a support foot 18. In the view of FIG. 1, the shelf 10 is shown as having a width that is less than that of the computing unit 14. However, in some embodiments, the shelf 10 may have a width considerably larger than that of the computing unit 14.

The computer 12 has the general configuration of the Apple iMAC® desktop computer, and the shelf 10 may be used with these computers. However, it should be understood that while certain aspects of this description may refer to the Apple iMAC® desktop computer, and may use its configuration as an example, shelves 10 according to embodiments of the invention may be used on other computers and other types of non-computer supports.

Figure 2:
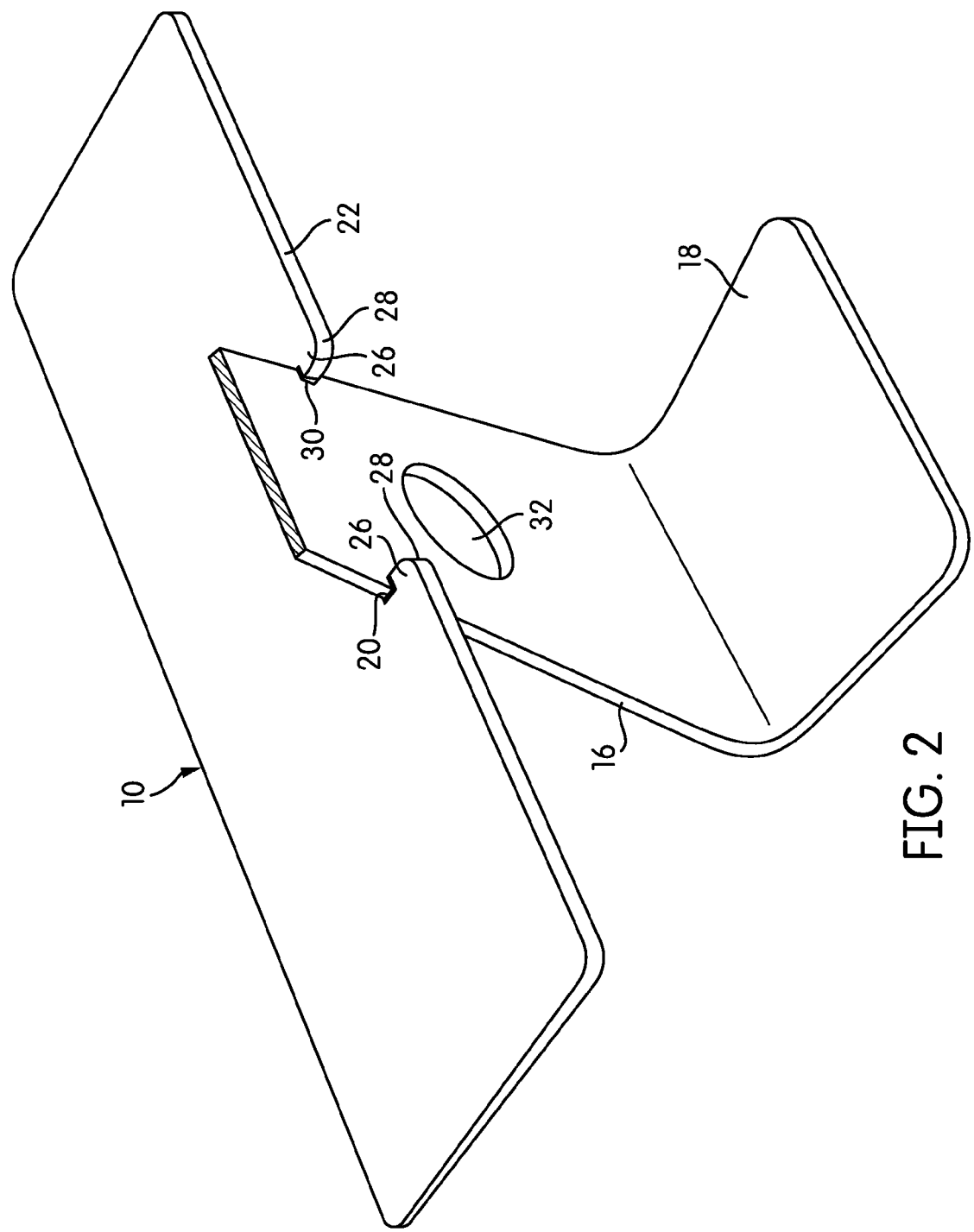
FIG. 2 is a cut-away perspective view of the shelf installed on the support arm.

FIG. 2 is a cut-away perspective view of the support arm 16 and the shelf 10 without the display and computing unit 14. Notably, the shelf 10 engages and rests on the support arm 16 without any clamps, external mounting hardware, or secondary supports. In the illustrated embodiment, a shaped slot 20 formed in the rear of the shelf 10 engages the support arm 16, and the fit between the slot 20 and the support arm 16 is sufficient to support the shelf 10. When installed, the shelf 10 is cantilevered on the support arm 16 and extends generally horizontally from it.

Figure 3:
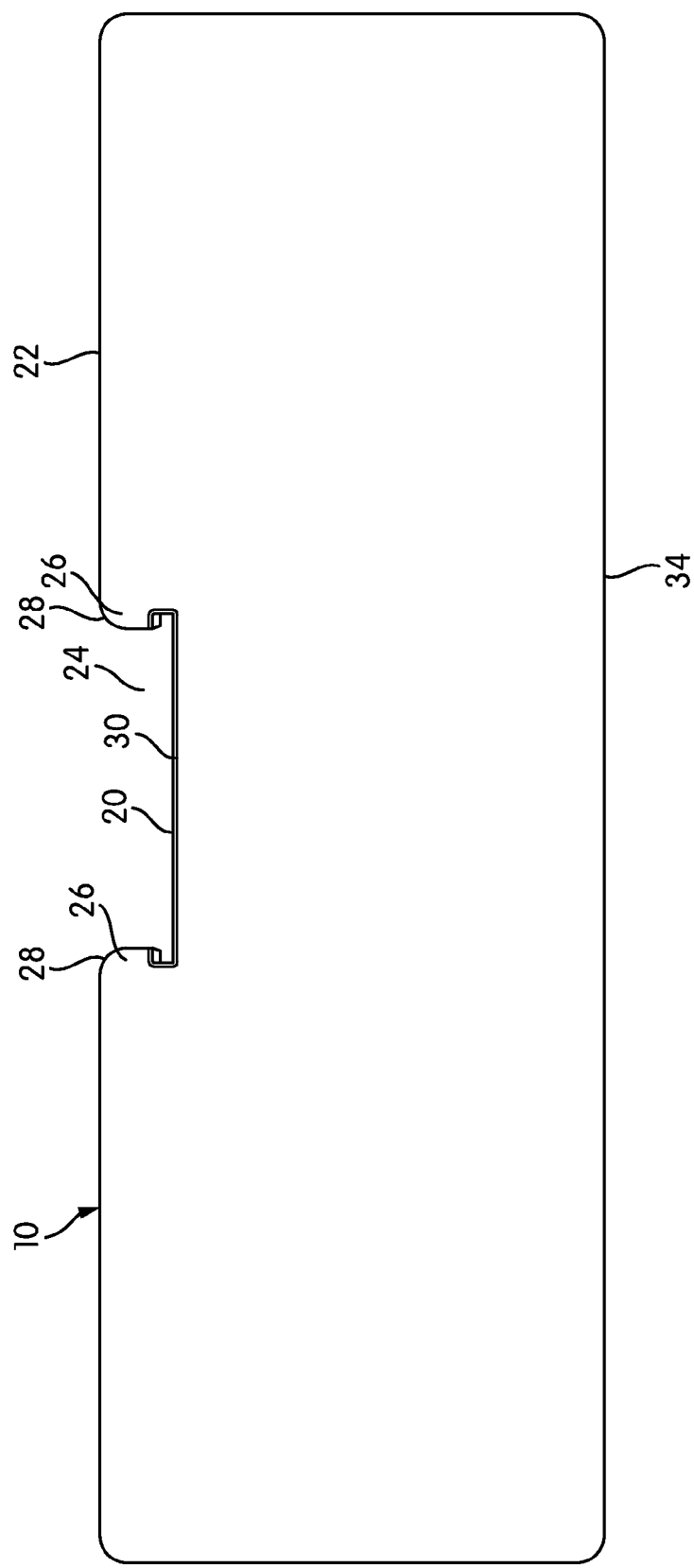
FIG. 3 is a top plan view of the shelf in isolation.

FIG. 3 is a top plan view of the shelf 10 in isolation. As shown particularly in FIGS. 2 and 3, the slot 20 opens along the back edge 22 of the shelf 16 and extends inwardly through the entire thickness of the shelf 16, leaving the slot open at the top and bottom. At its widest extent, the slot 20 is wider than its opening 24, which means that, in use, it partially "wraps around" the support arm 16, with two opposed projections 26 extending inwardly to partially wrap around the opposite side of the support arm 16. However, although the slot 20 and its projections partially wrap around the support arm 16, they do so in the plane of the shelf 10, without deflecting upward or downward. In the illustrated embodiment, the corners 28 of the opening 24 are rounded, although that need not be the case in all embodiments.

The shelf 10 may be made of a variety of materials, including plastics and metals. If the shelf 10 is intended to mirror the aesthetic of the desktop computer to which it is attached, it may be made of the same material as the computer itself. For example, aluminum and titanium are both materials of which the shelf 10 may be made. Depending on the material, the shelf 10 may be, e.g., cast, injection molded, or machined. If the shelf is made of aluminum by machining, the surfaces may, e.g., be milled to an appropriate finish. As will be described below in more detail, the slot 20 itself has a relatively complex shape that may be cut, for example, by wire electronic discharge machining (EDM).

If the shelf 10 is made of metal and the desktop computer 12 and support arm 16 are also made of metal, it is possible that a user might mar the finish of the desktop computer 12 with metal-to-metal scraping when placing the shelf 10. For that reason, and to reduce the need for a more complex manufacturing step like wire EDM, the slot 20 may be fitted with a plastic insert 30 (or an insert made of another type of low-friction material) that can be fit into or adhered to the interior of the slot 20. In some cases, the slot 20 and insert 30 may contain complementary engaging structures which secure one to the other. The plastic insert 30 may, for example, be injection molded from high-density polyethylene (HDPE) or polypropylene, to name two suitable materials.

If a plastic insert 30 is used, the insert 30, rather than the slot 20 itself, may carry the features and contours used to allow the shelf 10 to rest on the support arm 16. In that case, the contours and features of the slot 20 itself would be only those necessary to mate with the insert 30. Alternatively, in some embodiments, both the insert 30 and the slot 20 would carry similar features, with the insert 30 merely acting to cover the features of the slot 20 to prevent unwanted metal-on-metal abrasion.

In the following description, certain features that allow the shelf 10 to engage the support arm 16 will be described as being features of the slot 20. It should be understood that these features may actually be features of the insert 30, if there is an insert, features of the slot 20 itself, or features of both the slot 20 and the insert 30, depending on the embodiment. Of course, if the shelf 10 is injection molded of a plastic, there may be no need for an insert 30.

Figure 4:
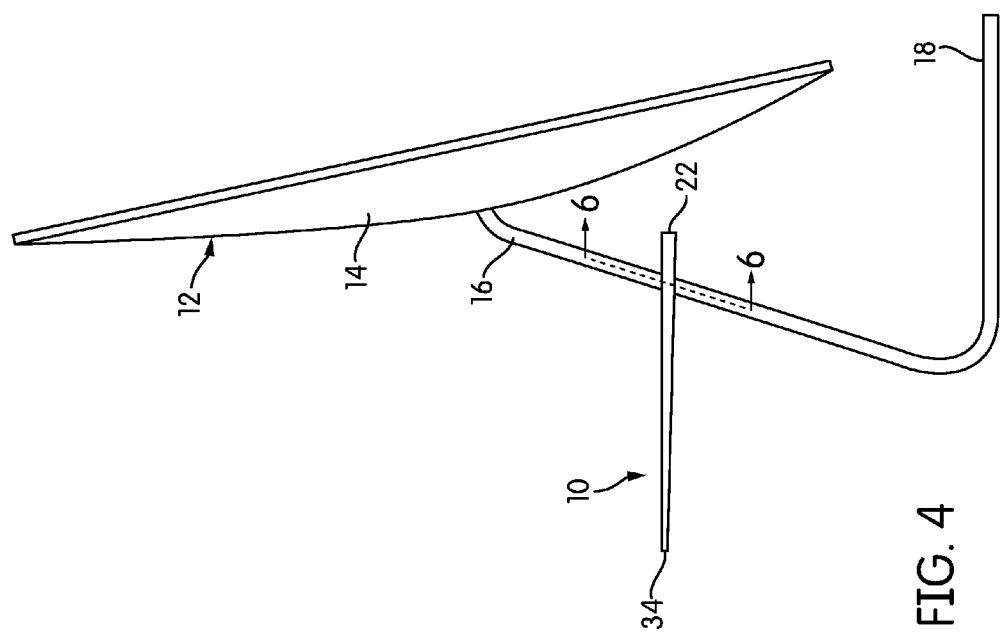
FIG. 4 is a side elevational view of the shelf installed on the support arm.

FIG. 4, a side elevational view of the desktop computer 12 with the shelf 10, and FIG. 5, a rear elevational view, illustrate the placement of the shelf 10 in more detail. In the illustrated embodiment, the shelf 10 rests on, and is cantilevered from, the support arm 10 just above the halfway point of the support arm 10. The placement of the shelf 10 preferably does not obstruct any openings or other functional features of the support arm 16 or the desktop computer 12 itself. In this case, the shelf 10 rests above a central opening 32 that allows power cords and other electrical and data cables to pass through the support arm 16.

As can be seen particularly in the side elevational view of FIG. 4, the shelf 10 of the illustrated embodiment tapers in thickness, such that it is thickest at its back edge 22 and tapers gradually toward the forward edge 34, where it is thinnest. The taper shown in FIG. 4 is optional, and need not be present in all embodiments. Preferably, the top surface of the shelf 10 is at least substantially flat, such that it can receive objects. However, the underside of the shelf 10 may have any shape or contour, and the shelf 10 itself may have any thickness or range of thicknesses so long as it retains sufficient mechanical strength to support its own weight and the weight of objects placed on it.

FIG. 6 is a sectional view of the shelf, taken through Line 6-6 of FIG. 4, and essentially showing a width-wise elevational section of the shelf. As those of skill in the art will realize, a shelf with a rectangular slot of a fixed size will rest on a trapezoidal support, such as the support arm 16, where the width of the support becomes greater than the width of the slot. Thus, in some embodiments of the shelf 10, the slot 20 could simply be a rectangular slot with a width that is narrower than the width of the support arm 16 at the point where the shelf 10 is intended to rest. However, in that case, the fit of the slot 20 on the support arm 16 might be at least somewhat loose. Thus, the slot 20 includes features intended to improve the quality of the interface between the slot 20 and the support arm 16, in order to reduce the potential amount of "play" between the two and thereby improve the stability of the shelf 10.

As shown in FIG. 6, the edges of the slot 20 are angled inwardly at an angle A that is at least approximately the same as the angle at which the support arm 16 tapers. In most embodiments, the angle A will be equal to the angle of the width taper of the support arm 16, or as nearly equal as possible given manufacturing tolerances. Thus, when the shelf 10 is seated on the support arm 16, it is less likely to shift horizontally or wobble.

FIG. 7 is a sectional view of the shelf 10 taken through Line 7-7 of FIG. 5, essentially a length-wise section of the shelf 10. As shown in FIG. 7, the short sides of the slot 20 are generally parallel and angled at an angle B, such that they define a channel 36 into which the thickness of the support arm 16 fits. The angle B is selected based on the angle at which the support arm 16 descends (and in most cases is equal to the angle at which the support arm 16 descends), and allows the shelf 10 to rest horizontally when it is fully seated on the support arm 16.

Some desktop computers 12 may have support arms 16 that taper or change in thickness as well as in width. In those cases, an increase in thickness of the support arm 16 relative to the width of the channel 36 may also cause the shelf 10 to seat on the support arm 16. In fact, as those of skill in the art will appreciate, if a support arm 16 tapers or changes in both width and thickness, it may be advantageous if the slot 20 is sized and contoured to take advantage of both tapers in the support arm 16. However, for the reasons described briefly above, only one taper or reduction, in either width or thickness, may be sufficient to seat the shelf 10 on the support arm 16.

FIGS. 6 and 7 also illustrate the particular shape of the slot 20 and the insert 30, as well as the interengaged relationship of the two components. The insert 30 is relatively thin toward the top of the shelf 10 and broadens toward the bottom of the shelf 10. The shelf 10 has a depending projection 38 on its underside that fits into a trough 40 defined in the insert 30 to secure the insert 30 to the slot 20. Other types of engaging structures may be used in other embodiments and, as was noted briefly above, in some embodiments, the contours of the interfacing surfaces of the slot 20 and the insert 30 may be simpler and straighter, and adhesive may be used to secure them together. However, adhesive may not be necessary—in some cases, the interengagement of the slot 20 and the insert 30 alone may be sufficient, and when in use, the forces created by gravity and friction will tend to push the insert 30 and the slot 20 together.

The shape of the insert 30, thin at the top of the shelf 10 and wider at the bottom, also provides an aesthetic benefit: the insert 30 is barely noticeable on the top surface of the shelf 10 as a thin ring around the interior perimeter of the slot 20, yet the insert 20 is sufficient to protect the support arm 16 from marring and abrasion.

The shelf 10 uses no external fasteners, connectors, or structures that are spaced from the shelf 10 itself. Thus, a user can install the shelf 10 simply by placing the slot 20 around the support arm 16 and allowing the shelf 10 to slide down the support arm 16 until it comes to rest.

As was noted briefly above, the shelf 10 also has no out-of-plane lips or flanges that bear against the support arm 16. In that sense, the shelf 10 may be considered to be generally flat, although the shelf 10 may have a taper or contour, and the individual surfaces of the shelf 10 themselves need not necessarily be flat.

The present inventor has found that for most loads under most conditions, the above-described arrangement is adequate to seat and retain the shelf 10 on the support arm 16. However, in situations in which particularly heavy loads are to be carried, where the shelf 10 might be dislodged or jarred by a passerby, or in other, more difficult, circumstances, some additional reinforcement of the connection between the shelf 10 and the support arm 16 may be useful. When reinforcement is necessary or would be useful, small internal set screws can be used.

FIG. 8 is a cut-away perspective view of another embodiment of a shelf, generally indicated at 100, installed on the support arm 16 of a desktop computer (not shown in FIG. 8). The shelf 100 has essentially the same shape and features as the shelf 10 of the previous embodiment; therefore, the above description will suffice for most of its features.

When set screws are used, they may be placed in a variety of locations. In the shelf 100, set screws 102 are installed within small holes 104 located in the rear corners 105 of the shelf 100. In the perspective view of FIG. 8, only one set screw hole 104 is shown; however, the two rear corners 105 of the shelf 100 are mirror images of one another, and a second screw hole 104 is provided in the other corner 106.

Figure 9:
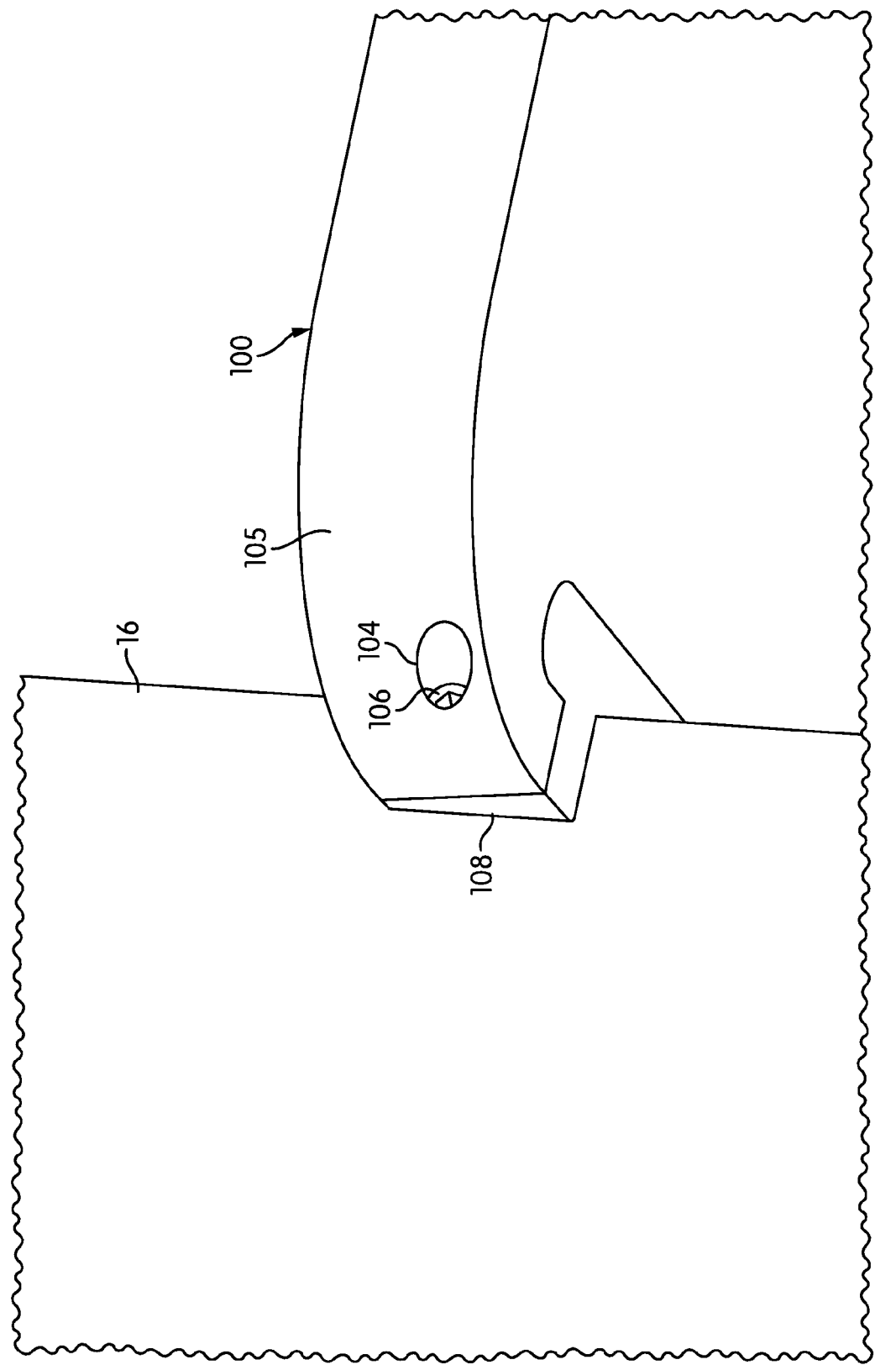
FIG. 9 is an enlarged perspective view of a portion of the shelf and support arm of FIG. 8, illustrating the placement of set screws within the shelf.
Figure 10:
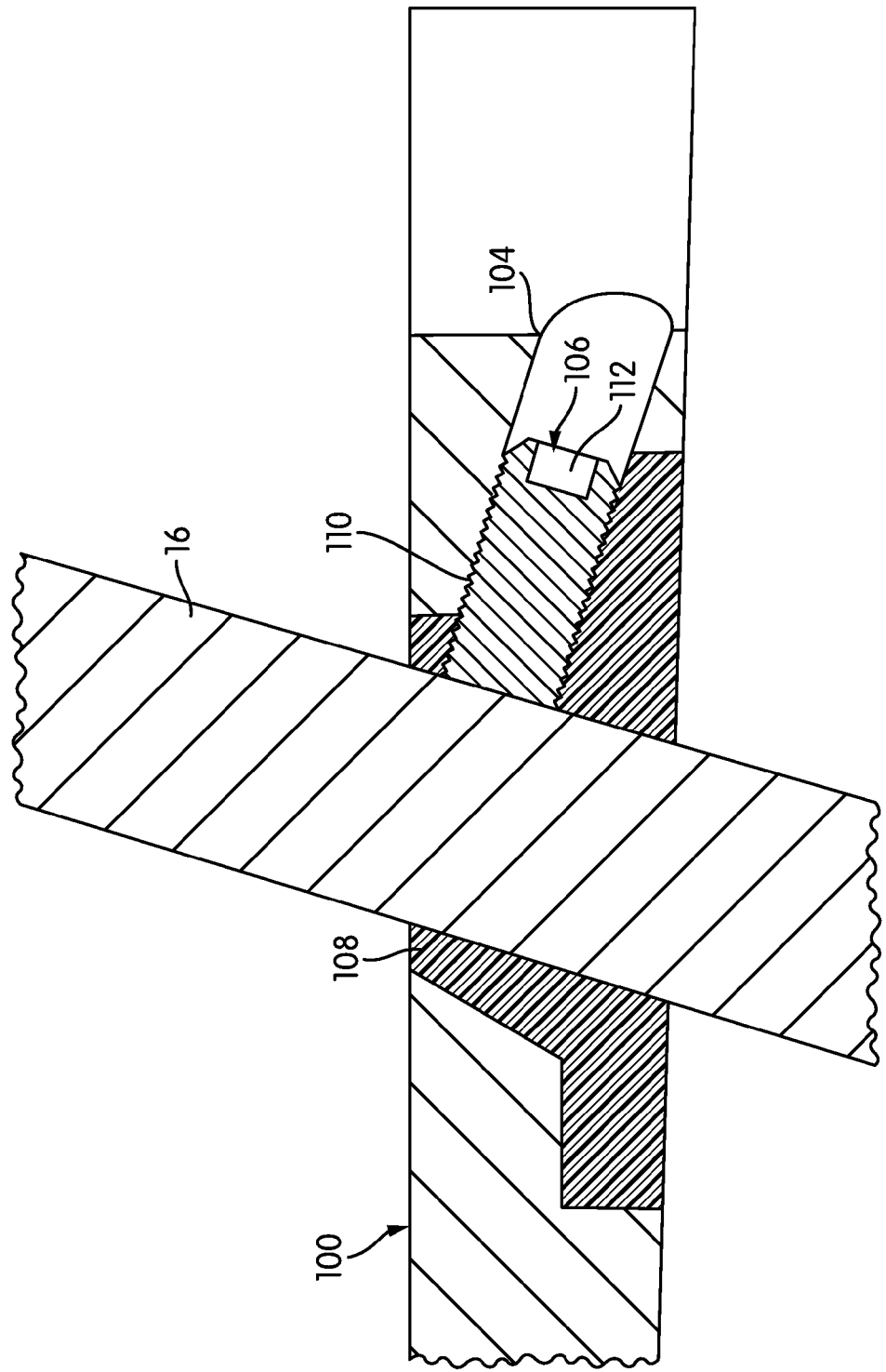
FIG. 10 is a sectional view of the shelf, taken through Line 9-9 of FIG. 8.

FIG. 9 is an enlarged perspective view of a portion of FIG. 8, illustrating one of the corners 105 of the shelf 100, as well as the details of the hole 104 and the set screw 106, and FIG. 10 is a sectional view of the shelf 100 and support arm 16 taken through Line 10-10 of FIG. 8. As shown particularly in FIG. 10, the set screw 106 extends into the hole 104.

The shelf 100 carries an insert 108, and as can be seen in FIG. 10, the hole 104 in which the set screw 106 is inserted is only partially defined by the shelf 100—the insert 108 defines the inner portion 104 of the set screw hole 104. The set screw hole 104 and the inner portion 110 cooperate to act as a single channel for the set screw. The set screw 106 itself is threaded and may have, for example, a hex socket, a Phillips head socket, or any other type of socket 112 on the outer end to accept a fastening tool. In operation, one would typically seat the shelf 100 on the support arm 16, as described above, and then tighten the set screws 106.

The above description and the drawing figures describe and illustrate a single shelf 10, 100 on a support arm 16. However, as those of skill in the art will realize, multiple shelves 10, 100 may be used on a single support arm 16, provided that each of the shelves 10, 100 has a slot of a slightly different width, such that each of the shelves 10, 100 will rest at a different defined vertical position along the support arm 16. In that case, the shelves 10, 100 should be placed over the support arm 16 in a defined order, with the shelf 10, 100 having the largest slot 20 placed first, and the rest in descending order of slot 20 size.

In the above description, it is assumed that the shelf 10, 100 itself receives and supports objects. However, in some embodiments, the shelf 10, 100 may be used to support a larger shelf, e.g., a shelf that has a larger width or length. In that case, the shelf 10, 100 acts essentially as a support adapter. Any larger shelf that is used may have a cut-out on its underside in the shape of the shelf 10, 100 so that the shelf 10, 100 is concealed and the larger shelf rests flush.

Figure 11:
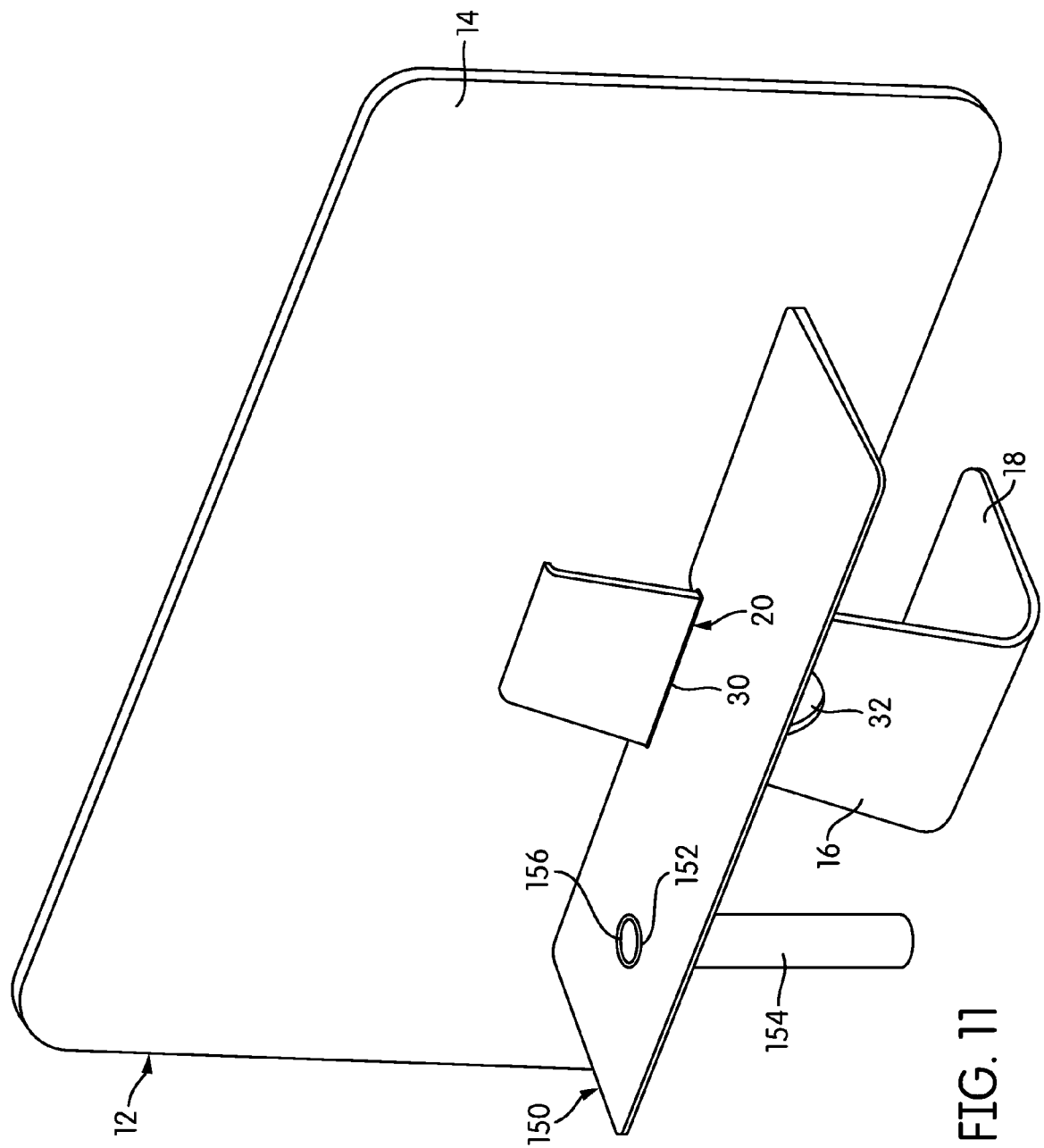
FIG. 11 is a perspective view of another embodiment of a shelf, shown as installed on a computer, and illustrating modifications made to the shelf to accommodate an accessory.

Shelves 10, 100 according to embodiments of the invention may have any number of additional features. A shelf 10, 100 may be equipped to receive any number of additional containers, compartments, or other peripherals. For example, FIG. 11 is a perspective view of a shelf 150 that includes an opening 152. A long, generally cylindrical vase 154 is suspended in the opening 152 by an upper annular lip 156. Depending on the embodiment, the opening 152 may be surrounded by a shallow trough, such that the lip 156 sits flush with the top surface of the shelf 10. In addition to openings to receive vases and other types of containers, in some embodiments, the shelf itself may be subdivided into any number of shallow or deep compartments. (Of course, if an opening like the opening 152, is present in the shelf 100, it may be used for cable management and other purposes as well.)

Figure 12:
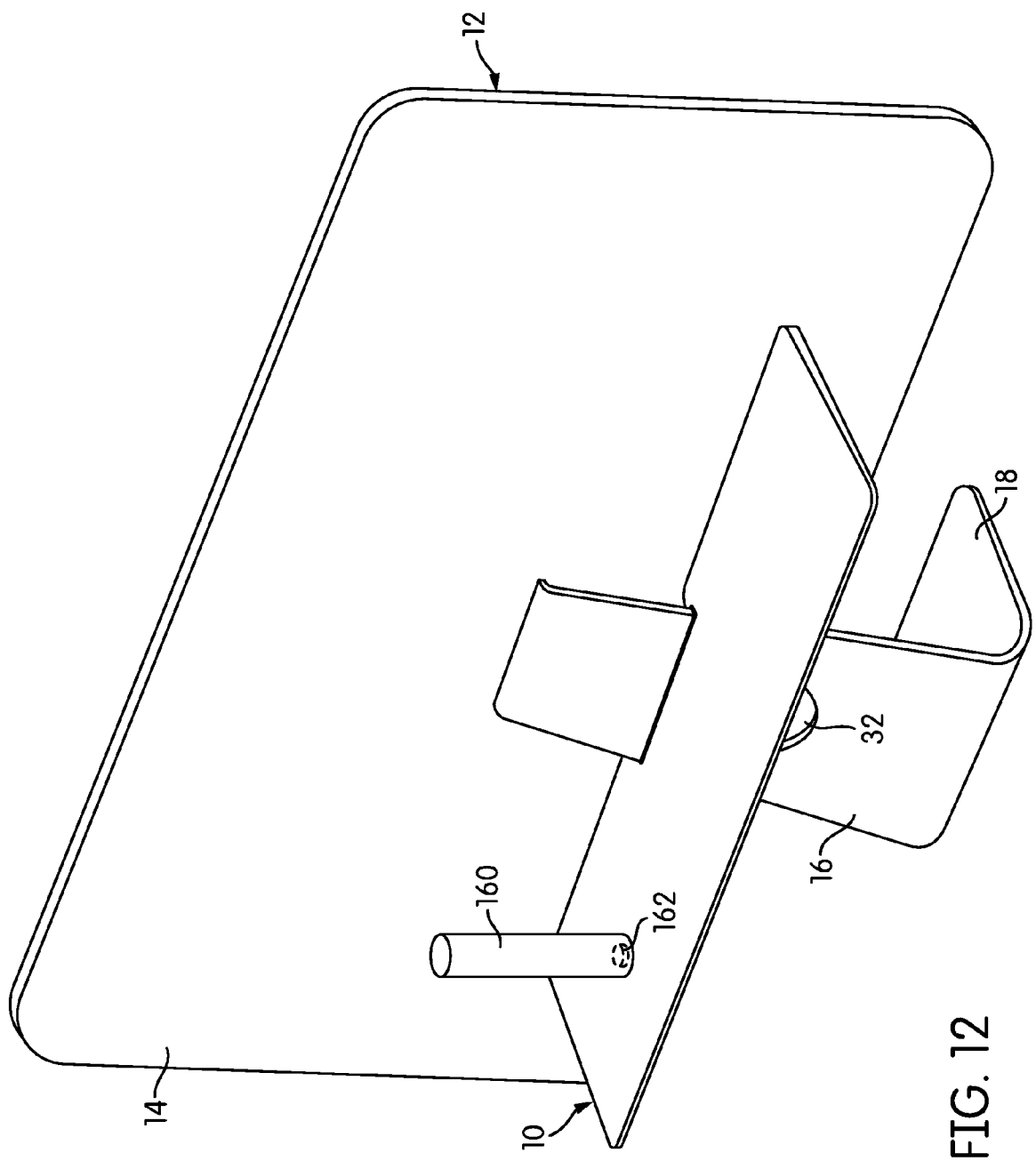
FIG. 12 is a perspective view of another type of shelf accessory installed without modifying a shelf according to an embodiment of the invention.

In some embodiments, a shelf according to an embodiment of the invention may receive or cooperate with containers and other peripherals without requiring physical modification. As one example, FIG. 12 is a perspective view of a shelf 10 installed on the support arm 16 of a desktop computer 12, similar to the view of FIG. 1. In the view of FIG. 12, a cylindrical vase 160, open at the top, rests on top of the shelf 10. The vase 160 of this embodiment is ferromagnetic, and is secured by a small magnet 162, such as a neodymium magnet, placed under the vase 160 on the underside of the shelf.

While the invention has been described with respect to certain embodiments, the description is intended to be exemplary, rather than limiting. Modifications and changes may be made within the scope of the invention, which is defined by the claims.

What is claimed is:

1. A shelf, comprising:
   a shelf body bounded by a substantially flat upper surface, a lower surface, a front edge, and a rear edge;
   a fixed-width opening defined in the rear edge of the shelf body, the opening being contiguous with a fixed-width slot within the shelf body that extends through a thickness of the shelf body and has a width that is wider than the opening, such that a pair of opposed projections are defined between the opening and the slot and the shelf body and its upper surface extend rearward of the slot, the slot being configured such that
   opposite interior sidewalls of the slot are angled inwardly at a first angle, such that the slot is wider at the lower surface than at the upper surface, and
   a pair of opposing channels are defined in the opposite interior sidewalls of the slot, the pair of opposing channels being inclined at a second angle;
   wherein the configuration of the opening is such that the shelf is adapted to rest in a defined position on a support that tapers at a taper angle that approximates or equals the first angle and that extends at an angle to the vertical that approximates or equals the second angle.

2. The shelf of claim 1, further comprising an insert adapted to engage the slot, the insert being configured to at least partially define the opposite interior sidewalls of the opening with their first angle and the pair of opposing channels inclined at the second angle.

3. The shelf of claim 2, wherein the insert is formed of a plastic.

4. The shelf of claim 3, wherein the shelf is formed of a metal.

5. The shelf of claim 2, wherein the shelf is without external hardware or external mounting structures for attachment to the support.

6. The shelf of claim 1, wherein the shelf is generally rectangular.

7. The shelf of claim 1, wherein the shelf is without external hardware or external mounting structures for attachment to the support.

8. The shelf of claim 1, further comprising one or more set screw holes, each of the one or more set screw holes being constructed and arranged to receive a set screw and to allow the set screw to abut and thereby engage the support.

9. The shelf of claim 8, wherein the one or more set screw holes comprise a pair of set screw holes.

10. The shelf of claim 9, wherein the pair of set screw holes are provided in or proximate to the projections.

11. A desktop computer with a shelf, comprising:
    a desktop computer including a computing unit supported by a support arm that tapers in width at a first angle and extends downwardly from the computing unit at a second angle to connect with a foot; and
    a shelf, including
      a shelf body bounded by a substantially flat upper surface, a lower surface, a front edge, and a rear edge,
      a fixed-width opening defined in the rear edge of the shelf body, the opening being contiguous with a fixed-width slot within the shelf body that extends through a thickness of the shelf body and has a width that is wider than the opening, such that a pair of opposed projections are defined between the opening and the slot and the shelf body and its upper surface extend rearward of the slot, the slot being configured such that
      opposite interior sidewalls of the slot are angled inwardly at a third angle that approximates or equals the first angle, such that the slot is wider at the lower surface than at the upper surface, and
      a pair of opposing channels are defined in the opposite interior sidewalls of the slot, the pair of opposing channels being inclined at a fourth angle that approximates or equals the second angle;

wherein the configuration of the opening is such that the shelf is adapted to rest generally horizontally, cantilevered in a defined vertical position on the support arm.

12. The desktop computer with a shelf of claim 11, wherein the shelf further comprises an insert adapted to engage the slot, the insert being configured to at least partially define the opposite interior sidewalls of the opening with their first angle and the pair of opposing channels inclined at the second angle.

13. The desktop computer with a shelf of claim 11, wherein the shelf is without external hardware or external mounting structures for attachment to the support.

14. The desktop computer with a shelf of claim 11, further comprising one or more set screw holes, each of the one or more set screw holes being constructed and arranged to receive a set screw and to allow the set screw to abut and thereby engage the support arm.

15. The desktop computer with a shelf of claim 14, wherein the one or more set screw holes comprise a pair of set screw holes.

16. The desktop computer with a shelf of claim 15, wherein the pair of set screw holes are provided in or proximate to the projections.

17. A shelf, comprising:
   a shelf body having a generally flat upper surface, a lower surface, a front edge, and a rear edge;
   a fixed-width opening defined in the rear edge of the shelf, the opening being contiguous with a fixed-width slot within the shelf body that extends through a thickness of the shelf body and has a width that is wider than the opening, such that a pair of opposed projections are defined between the opening and the slot and the shelf body and its upper surface extend rearward of the slot, the slot being configured such that
      opposite interior sidewalls of the slot are angled inwardly at a first angle, such that the slot is wider at the lower surface than at the upper surface, and
      a pair of opposing channels are defined in the opposite interior sidewalls of the slot, the pair of opposing channels being inclined at a second angle;
   wherein the configuration of the opening is such that the shelf is adapted to rest and extend generally horizontally in a defined vertical position on a support that tapers at a taper angle that approximates or equals the first angle and that extends at an angle to the vertical that approximates or equals the second angle.

18. The shelf of claim 17, further comprising an insert adapted to engage the slot, the insert being configured to at least partially define the opposite interior sidewalls of the opening with their first angle and the pair of opposing channels inclined at the second angle.

* * * * *